Dec. 15, 1964 · O. FIRING 3,160,948
METHOD AND APPARATUS FOR MAKING ZIPPER FASTENERS
Filed Feb. 14, 1962 2 Sheets-Sheet 1
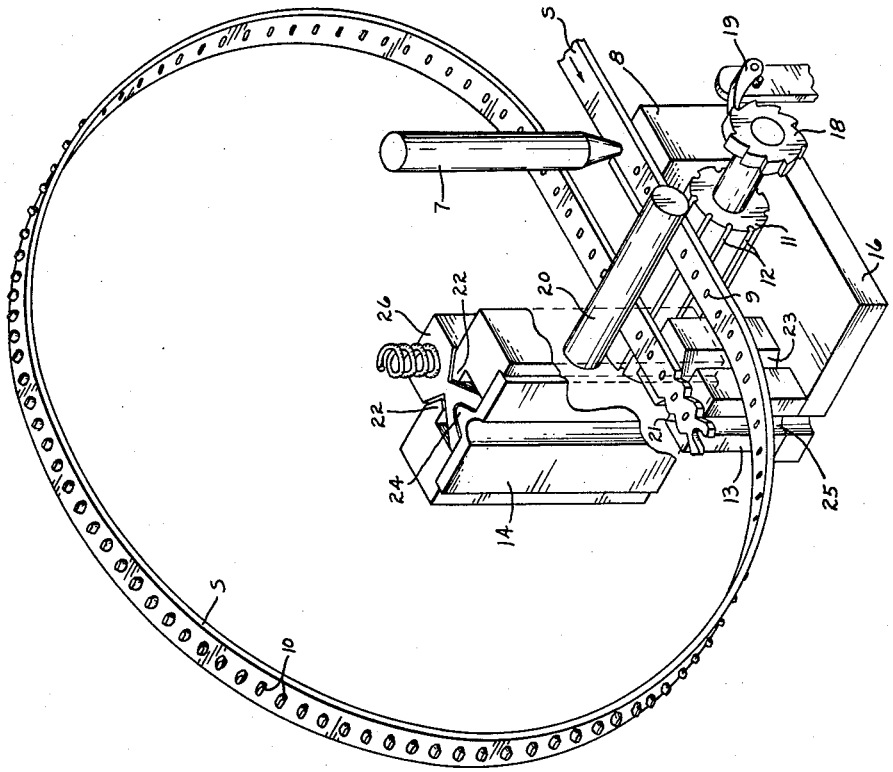
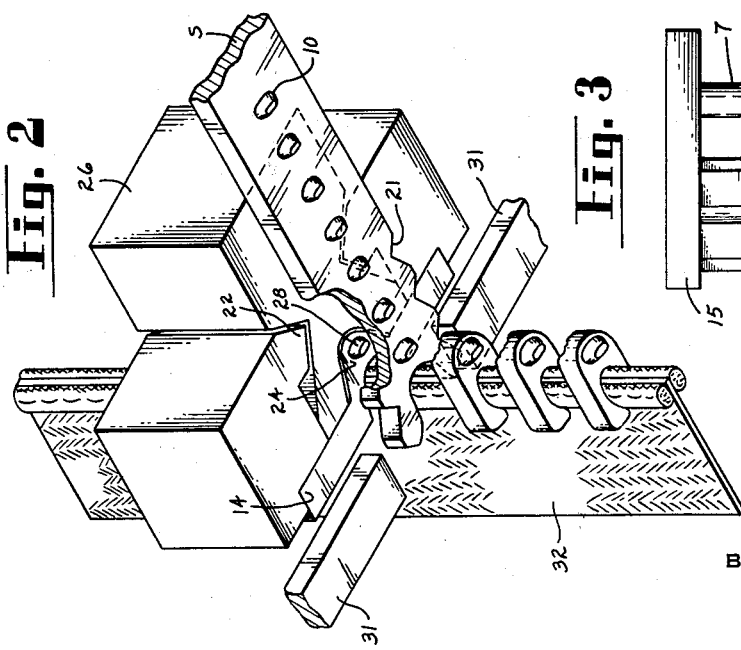
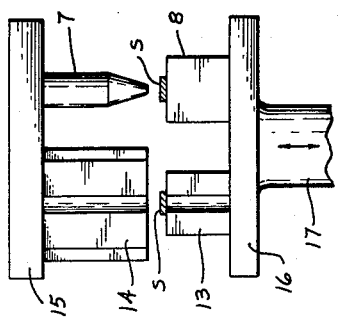
INVENTOR
Osborne Firing
BY
*H. F. Johnston*
ATTORNEY Dec. 15, 1964   O. FIRING   3,160,948
METHOD AND APPARATUS FOR MAKING ZIPPER FASTENERS
Filed Feb. 14, 1962   2 Sheets-Sheet 2
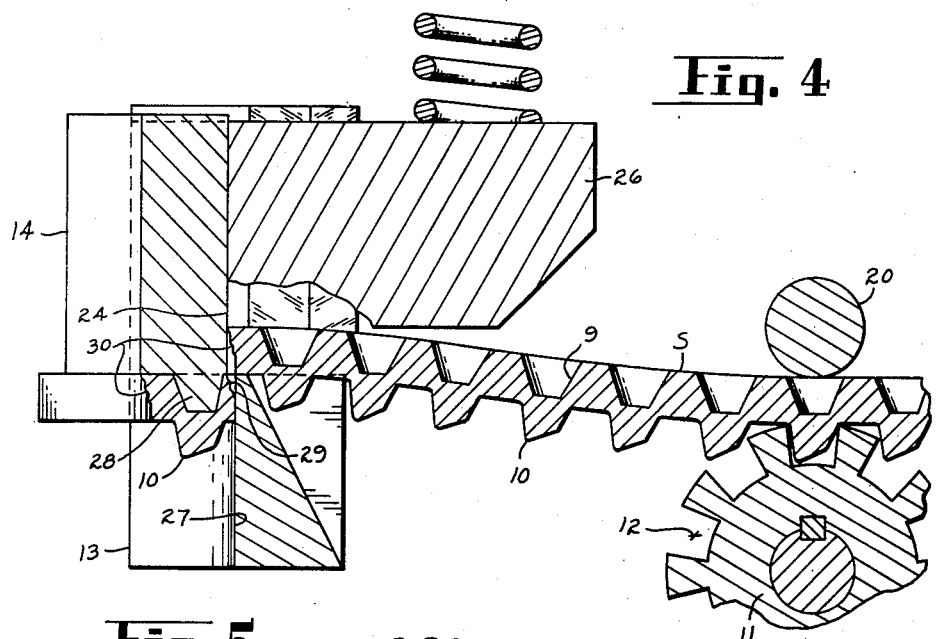
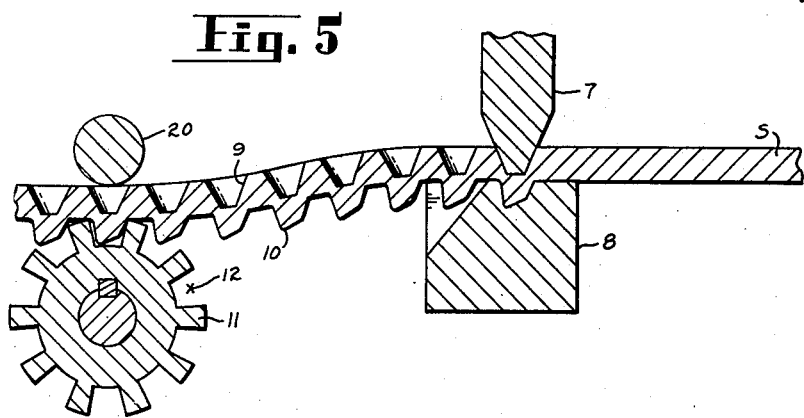
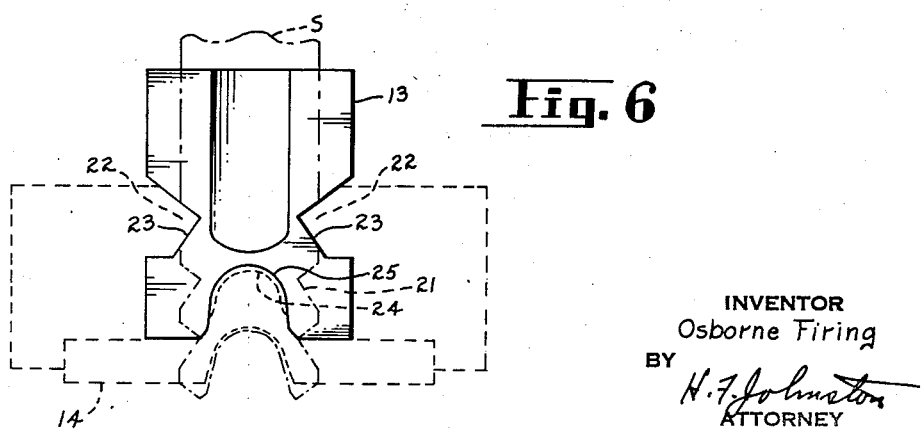
INVENTOR
Osborne Firing
BY
H. F. Johnston
ATTORNEY United States Patent Office 3,160,948
Patented Dec. 15, 1964

3,160,948
METHOD AND APPARATUS FOR MAKING
ZIPPER FASTENERS
Osborne Firing, Woodbury, Conn., assignor to Scovill
Manufacturing Company, Waterbury, Conn., a corporation of Connecticut
Filed Feb. 14, 1962, Ser. No. 173,237
5 Claims. (Cl. 29—410)

My invention relates to the manufacture of zipper fasteners and particularly to that kind of apparatus and method known as the flat wire process as distinguished from another class of machines utilizing wire which has been rolled to a Y-shaped section.

The flat wire process has some advantages over the formed wire process in that the raw material is somewhat easier to produce and the machine is simple, more economical to manufacture and capable of somewhat higher speeds of operation.

One of the drawbacks of the flat wire process heretofore has been that it is difficult to manufacture a fastener element with a sufficient head height as compared to elements made by the formed wire process.

Another problem in all prior machines of this type is that of tool maintenance. This latter problem which is to a considerable extent related also to the first fault, arises from the fact that the wire tends to elongate when it is swaged by the forming punch and die in forming the fastener element heads. Such elongation causes the wire to bear hard against the shearing die (or punch) when the end of the wire moves back across the end of such punch or die, thus causing severe wear of the sharp edges or corners of the punch or die. To minimize this tendency, the height of the projection and depth of the recess have been compromised so that the resulting fastener element does not produce as good a fastener.

These faults are overcome in my invention without sacrificing simplicity or operating speed. In accomplishing this result, the forming tools and shearing tools are spaced not only from each other in the longitudinal direction of the wire, but also laterally so that the wire after being formed with the fastener element heads, extends in a complete loop around the top of the machine and enters the shearing tools in the same direction and with the heads oriented in the same way.

A single feed is provided which extends transversely and engages that section of the wire which follows the forming tools and another section preceding the shearing tools. This eliminates any crowding of the end of the wire against the shearing tools, thus eliminating the maintenance problem at that point and also permitting the formation of a deeper recess and larger projection, or in other words, a better head height.

Another aspect of the invention has to do with the manner of shearing endmost elements from the end of the wire in which the fastener element heads each consisting of a recess and projection, have already been formed.

The head end of the element is constituted of the material sheared from between the legs of the following element which is the usual practice in machines of this general class. According to my invention, the shearing is done in such a way that the head end of each element is angled on its front face from about midway of the element back to the recessed side thereof leaving a correspondingly angled section of material at the crotch between the legs of the following element. This is accomplished by providing a substantial amount of clearance between the shearing punch and die in that section at the head end of the element, such end being supported during the shearing action by a pilot fitting into the recess of the element being sheared. The result is an improved fastener element which not only intermeshes more easily with mating element in a zipper, but which provides a stronger wall of metal between the recess and the crotch or space between the legs of the element.

Other objects and advantages of my invention will hereinafter more fully appear.

In the accompanying drawings, I have shown for purpose of illustration, one embodiment which my invention may assume in practice. In these drawings:

FIG. 1 is a schematic perspective view illustrating my improved process and apparatus;

FIG. 2 is a perspective view with parts broken away, showing the underside of the upper portion of the shearing tools;

FIG. 3 is a vertical front view showing the general relation of the forming and shearing tools;

FIG. 4 is a vertical central section through the shearing tools;

FIG. 5 is a vertical section through the forming tools; and

FIG. 6 is a plan view of the shearing tools.

In FIG. 1, the strip S is a flat strip of metal entering from the right to the left. It first passes between a forming punch 7 and forming die 8 to form a series of equally spaced fastener element heads, each consisting of a recess 9 and a projection 10. The strip then passes over a feed roller 11 having longitudinally extending grooves 12 adapted to engage the projections 10 on the strip. The strip next passes around the top of the machine in the form of a relative large loop and passes again over the feed roller 11 and between the lower movable shearing tool 13 and an upper stationary shearing tool 14.

The forming punch 7 and the stationary shearing tool 14 are held in a fixed position in any suitable manner in the head of the machine indicated diagrammatically at 15 while the forming die 8 and movable shearing tool 13 are fixed to a common supporting head 16 connected to a plunger 17 which is reciprocated in a vertical direction by a suitable power-driven cam, not shown.

The strip S is fed forwardly after each forming operation by the intermittently acting ratchet 18 and pawl 19 to advance the feed roller 11 and strip S a distance equal to the spacing between the fastener element heads, the strip being held against the feed roller by a suitable pressure roller 20. Feeding takes place, of course, between successive forming and shearing operations.

It will be observed that the forming tools and shearing tools are spaced not only in the lengthwise direction of the feed, but also spaced laterally so that the strip must assume a loop as it leaves the feed rollers and come back alongside itself to re-enter the feed rollers before passing into the shearing tools. The strip feeding means is located after the forming tools and before the shearing tools so that regardless of the amount of elongation caused in the head-forming process, there will always be just enough forward feed to take care of the exact length of strip required to make an element.

The shearing tools have means to form side notches 21 in the strip prior to severing. This is accomplished by the V-shaped portions 22 projecting toward each other on the upper shearing tool 14 cooperating with corresponding grooves 23 in the lower or movable shearing tool 13. The element itself is sheared by the projection 24 cooperating with a correspondingly shaped groove 25 on the movable shearing tool 13.

The shearing action is accomplished by the lower shearing tool 13 moving upwardly, pushing the end portion of the strip S with it, while the end element to be sheared is held under the stationary shearing tool 14, and at the same time notches 21 will be formed in the strip at a short distance from the end element. A springheld pressure pad 26 bears on the strip and returns it to its original position. This action is more clearly seen in FIG. 4 wherein it will be observed that the length of strip between the shearing tools and feed roller flexes upwardly during shearing. A similar action takes place in the process of forming the head as seen in FIG. 5.

In FIGS. 4 and 6, it will be observed that there is a substantial amount of clearance between the forward edge of the projection 24 of the upper shearing tool and inner wall 27 of the bottom shearing tool, and also that during the shearing operation, a pilot 28 fits into the recess of the element being sheared. This results in breaking of the metal from a point about half-way across its thickness along an angle as indicated by the numeral 29 at the head end of the scoop, and a correspondingly angled portion 30 in the crotch between the legs of the next following fastener element. This angling of the fastener element head toward the recess is very desirable because it gives a smoother acting zipper and even permits of what is known as a "two-way" fastener. In other words, the fastener can be closed by movement of the slider in either direction. In addition, the extra thickness of the wall between the recess 9 and the crotch provides for extra strength or even may permit of a shorter length of metal for forming a fastener element of any given strength.

While it does not form any part of my invention, I have shown in FIG. 2 side operating tools 31 for clamping the fastener element to the beaded edge of a tape 32. The timing of these tools is such that the clamping action takes place immediately after or even slightly prior to the completion of the severing action.

Looking again at FIG. 4, it will be observed that in accordance with prior practice where the forming of the heads was in line with the shearing tools, the elongation of the strip caused by the forging of the material would cause the end of such strip to bear hard against the front surface of the shearing tool, which in this case would be the front face of the projecting portion 24 of the upper tool. However, with my improved process and apparatus, the feed into the shearing tools can be precisely that required for one fastener element so that no such elongated metal has to be taken care of. Furthermore, the breaking of the end of the strip at the angle as described above, further alleviates any tendency for the end of the strip to bear hard against the shearing tool. Thus, the cutting edge or corner of the shearing tool will not tend to break off and wear rapidly as in the prior practices; and furthermore, no compromise need be made on the amount of forging of the metal so that the desired height of projection 10 and depth of the recesses 9 may be produced.

What I claim is:
1. In an apparatus for making zipper fastener elements from flat wire stock, the combination of
    (a) a forming punch and complementary die movable relative to one another for forming fastener element heads consisting of recesses on one side of the wire and projections on the opposite side;
    (b) shearing tools for cutting fastener elements from the end of the wire each containing one of said projections and recesses, said shearing tools being spaced both laterally and longitudinally from said forming punch and die with respect to the direction of movement of the wire, whereby the wire after passing through said forming punch and die may assume at least one complete loop and pass through the shearing tools in the same direction and with the fastener element heads oriented in the same way; and,
    (c) wire feeding means operating simultaneously on a section of wire following said forming punch and die and another section preceding said shearing tools for pulling a length of wire from said forming tools and pushing an identical length of wire into said shearing tools.
2. In an apparatus for making zipper fastener elements from flat wire stock, the combination defined in claim 1 wherein said wire feeding means comprises a feeder extending across the path of the wire as it enters the shearing tools and having recesses therein adapted to engage with the projections on the wire.
3. The combination defined in claim 2 wherein the feeder comprises a roller having spaced-apart grooves extending longitudinally of the roller, which grooves are adapted to engage the projections in the wire.
4. In an apparatus for making zipper fastener elements from flat wire stock, the combination defined in claim 1 and
    (d) notching tools carried by the shearing tools for forming notches in the sides of wire preliminary to shearing.
5. A process for making zipper fastener elements from flat wire stock which comprises
    (a) successively forming recesses and projections on opposite sides of the flat wire;
    (b) forming a loop of such wire containing the projections and recesses;
    (c) shearing formed elements from the advancing end of such loop; and,
    (d) feeding the wire through both forming and shearing operations by common feeding means which pulls the wire from the forming operation and feeds an identical amount of the formed wire into the shearing operation.

References Cited in the file of this patent
UNITED STATES PATENTS

| | | |
|---|---|---|
| 2,377,857 | Belanger | June 12, 1945 |
| 2,486,941 | Graf | Nov. 1, 1949 |
| 2,685,127 | Kaufmann | Aug. 3, 1954 |
| 2,766,516 | Chantler | Oct. 16, 1956 |